United States Patent [19]

Turner

[11] 4,264,370
[45] * Apr. 28, 1981

[54] METHOD FOR PREPARING ALUMINUM-BASED AIR DRYING COMPOSITIONS

[75] Inventor: John H. W. Turner, Chapel en le Frith, England

[73] Assignee: Manchem Limited, London, England

[ * ] Notice: The portion of the term of this patent subsequent to May 23, 1995, has been disclaimed.

[21] Appl. No.: 880,391

[22] Filed: Feb. 21, 1978

Related U.S. Application Data

[60] Division of Ser. No. 662,553, Mar. 1, 1976, Pat. No. 4,090,886, which is a continuation-in-part of Ser. No. 434,465, Jan. 18, 1974, abandoned.

[51] Int. Cl.$^3$ .................................................. C09D 3/26
[52] U.S. Cl. .................................... 106/264; 106/310; 260/22 EP; 260/22 CA
[58] Field of Search ............................. 106/264, 310; 260/22 CA, 22 EP

[56] References Cited

U.S. PATENT DOCUMENTS

| | | | |
|---|---|---|---|
| 2,613,162 | 10/1952 | Chatfield | 106/264 |
| 2,871,135 | 1/1959 | Weiss | 106/252 |
| 3,196,118 | 7/1965 | Peters | 106/310 |
| 3,242,196 | 3/1966 | Rheineck | 106/264 |
| 3,755,189 | 8/1973 | Gilchrist et al. | 106/252 |
| 4,090,886 | 5/1978 | Turner | 106/264 |

FOREIGN PATENT DOCUMENTS

| | | |
|---|---|---|
| 1041465 | 10/1953 | France . |
| 1047465 | 12/1953 | France . |
| 720176 | 12/1954 | United Kingdom . |
| 734675 | 8/1955 | United Kingdom . |
| 740251 | 11/1955 | United Kingdom ............ 260/22 CA |
| 804981 | 11/1958 | United Kingdom . |
| 848270 | 9/1960 | United Kingdom . |

Primary Examiner—Lorenzo B. Hayes
Attorney, Agent, or Firm—James R. Thornton

[57] ABSTRACT

Method for preparing storage-stable air-drying compositions containing a combination of an aluminum alkoxide with a labile monofunctional reactant such as an alkanol, alkoxyalkanol, keto ester, water, hydrogen peroxide, organic hydroperoxide or mixtures thereof.

11 Claims, No Drawings

METHOD FOR PREPARING ALUMINUM-BASED AIR DRYING COMPOSITIONS

This is a division of application Ser. No. 662,553, filed Mar. 1, 1976, now U.S. Pat. No. 4,090,886, which in turn is a continuation-in-part of my copending application Ser. No. 434,465 filed Jan. 18, 1974, now abandoned.

This invention relates to air drying compositions containing organo-aluminum compounds and certain organoaluminum compositions which act as driers.

By the term "drier" we mean a material which, when added to an organic film forming substance such as a polymerized drying oil or alkyd resin, promotes the conversion of the applied film from the liquid to the gel state with adequate properties to enable it to function effectively as a protective or decorative coating. Some driers function by catalyzing the process of oxidative polymerization through the unsaturation of the drying oil component. Examples of such driers include cobalt, lead and manganese soaps. Cobalt soaps are used primarily to catalyze surface drying and lead soaps for through drying. The ratio of cobalt to lead has to be carefully determined so as to ensure a satisfactory balance between both types of drying in order to produce films which possess good gloss, uniform film strength and are not marred by physical defects such as wrinkling. Other conventional driers, of which calcium is an example, appear to play a role which is more physical than chemical and which indirectly effect the drying process by enhancing the efficiency of the catalytic drier and directly by assisting in the process of micella formation which is thought to be an intermediate stage in the process of gelation.

More recently, zirconium driers have been used to an increasing extent to promote the drying process. While they are normally used in conjunction with a catalytic drier such as cobalt and a drying auxiliary such as calcium, their drying role appears to reside in their ability to co-ordinate with polar groups in the medium and thereby promote the conversion of the lower molecular weight component into micella and gels of which they are co-ordinated components.

It has become increasingly recognized that drying by non-catalytic means is advantageous in that it lessens the possibility of progressive oxidative degradation of the applied film by the action of atmospheric oxygen catalyzed by the residual catalytic drier contained in the film. The present invention provides a novel air-drying composition containing aluminum which utilizes this advantage.

It is known that whenever certain organo aluminum compounds are added to paints and varnishes containing drying oils or modified alkyd resins or other resinous bodies with which the aluminum compound can react, there occurs a reaction which causes an increase in the structure of the paint or varnish, leading in many cases to complete gellation which makes the paint or varnish unsuitable for use. In some cases, these paints and varnishes structured to the gel or near-gelled stage, can be rendered fluid by diluting them with more of the diluent solvent such as white spirit used to thin the paint or varnish. It has been found that the drying of such structured paints or varnishes, which have been made fluid by diluting with a volatile solvent, is substantially better than a paint of similar composition, but excluding the aluminum compound. Unfortunately, the need to dilute the structured paint in order to render it suitable for application reduces its binding power and gloss, and in this respect, adversely effects its performance as a protective or decorative coating.

My co-pending application, Ser. No. 620,239, filed Oct. 6, 1975, now U.S. Pat. No. 4,075,178, shows that it is possible to avoid this structuring reaction by using a much higher than normal amount of the aluminum alkoxide or its derivative and reversing the order of addition by adding the paint or varnish slowly and with thorough agitation to the aluminum compound.

U.S. Pat. No. 3,196,118 shows that aluminum compounds such as aluminum carboxylates may be used in coating compositions where they function as dispersion agents. In this case, they do not react with the alkyd or oil medium. It is also known (U.S. Pat. No. 2,613,162) that aluminum alkoxides and their derivatives have been used as thickening agents in film forming media. The use of these necessitates the employment of more diluent to enable the film to be applied. This in turn means that the coating composition contains a lower solids content and also a lower pigment content which leads to thin films having poor covering qualities. The drying of the resultant film tends to take longer due to the higher average micella size of the film forming constituent. Additionally, U.S. Pat. No. 2,835,685 discloses compounds that are of low viscosity at high temperatures which associate and gel on cooling, making it virtually impossible to use them in film forming compositions containing a high solids content, since to be workable much solvent is needed.

I have now found it possible to obtain the desirable characteristic of storage stability with mixture ratios of aluminum compound to reactive paint media which would normally prove unstable and cause gellation in the container before being applied. Furthermore, I have found that by choosing appropriate proportions of aluminum compounds, I am able to obtain improved drying and other film properties when compared with aluminum-free media of otherwise similar composition. Also, I have been able to achieve these desirable objectives in a medium of which the predominant component is a conventional oil or alkyd resin.

Thus, it is possible to prepare media containing aluminum compounds having at least one alkoxy group which have a low viscosity, are stable on storage and have a solids content as high as about 80%. The compositions of the present invention dry initially by gelation which is exceedingly rapid and subsequent hardening is by oxidative polymerization. The use of the aluminum compounds of this invention enables one to use less oxidation catalyst or in some cases it may be totally eliminated. This in turn also prevents the subsequent oxidative degredation of the film referred to above.

These highly desirable effects have been achieved by the discovery that certain labile monofunctional reactants will react preferentially to impede the complex association which occurs when aluminum compounds are added to drying oils or paint media containing such reactive groups as hydroxyl and carboxyl. It is assumed that in the presence of the labile reactant, an equilibrium is established which is disturbed when the film is applied to a surface whereby the labile reactant is released by hydrolysis or by its own volatility. The equilibrium may be represented as follows:

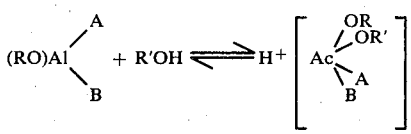

The drying oil must have at least 1 gram mole of labile monofunctional reactant per gram atom of aluminum to obtain the desirable storage stability characteristics.

The labile monofunctional reactants are the lower alkanols having up to about eight carbon atoms, including the cycloalkanols, lower alkoxy substituted alkanols and enolic forms of such compounds (keto esters), water, hydrogen peroxide, organic hydroperoxides, and mixtures thereof. Examples of such reactants include isopropanol, isobutanol, secondary-butanol, cyclohexanol, ethoxyethanol, di-acetone alcohol, the higher monoalkyl ethers of glycol, tert-butyl hydroperoxide, cumenyl hydroperoxide, acetyl acetone and ethyl acetoacetate as well as water and hydrogen peroxide. The branched and cycloalkanols are preferred, although the keto esters can have particular merit when a higher level of resistance to hydrolysis is required than can be achieved readily with such other labile substituents as ethoxyethanol.

Suitable aluminum compounds may be defined as having the formula

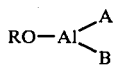

wherein R is selected from the group consisting of lower alkyl, lower cycloalkyl, lower alkoxyalkyl and monocyclic aryl, and each of A and B is selected from the group consisting of OR, monocarboxylic acid, and half esters of dicarboxylic acids. Examples of such carboxylic acid and ester groups include β-ketocarboxylic acid esters, phthalate half esters, maleate half esters, malonic diesters, carboxylic and aminocarboxylic acid.

The preferred aluminum compounds are alkoxides, such as aluminum triisopropoxide, and the mono- di- and tri-substituted products thereof using as substituents for example those obtained from the following reactants:
ethoxyethanol
butoxyethanol
cyclohexanol
2-ethylhexoic acid
3,5,5-trimethyl hexoic acid
versatic acid
naphthenic acid
acid monoisopropyl phthalate
acid monoethoxy ethoxyl maleate The preferred aluminum compound may be dissolved in the selected labile monofunctional reactant or a mixture thereof with labile non-reactive diluent such as white spirit, xylene or other hydrocarbons or chlorinated hydrocarbons which have suitable physical properties for the application. Ketones and esters may also be used as non-reactive labile diluents. Fatty acids such as the drying, semi-drying and non-drying oils of natural origin may also be used as non-volatile diluents, as may plasticisers such as the phthalic, maleic and phosphate esters.

The use of aluminum isopropoxide, or aluminum isopropoxide in which the combined isopropanol is substituted by similarly labile materials, is preferred when an aluminum drier of maximum drying efficiency is the primary requirement. In such cases, the incorporation of labile tautomeric compounds is particularly beneficial in imparting resistance to hydrolysis by atmospheric moisture or fortuitous water from other sources. Where drying efficiency is secondary to other film requirements, such as compatibility, water resistance, durability or other properties which can be modified by the presence of a substituent retained in the applied film, aluminum compounds incorporating the non-volatile substituent will be favored.

The preferred method of addition for the aluminum compound is to make a concentrate by adding the drying oil to the solution of the aluminum compound with effective stirring to ensure uniform mixing and the avoidance of heterogeneity. In some cases, heating is useful to reduce the viscosity of the reactants and to improve their mixibility. The concentrate may be diluted to the appropriate aluminum content by adding it to the paint medium. Conversely, the paint medium can be added to the concentrate.

The presence of the labile monofunctional reactant as diluent is sufficient to confer a high level of storage stability when the aluminum compounds are used at the optimum concentration for drying performance in media of this type conventionally used in the formulation of gloss paints designed for application by brush. However, there are some media of higher reactivity which may prove less stable because of a combination of high molecular weight and high carboxyl group functionality. I have found that such media can be made equally suitable for use with aluminum driers by reducing their carboxyl functionality or acid value to a sufficiently low level. It may not be possible to bring about an adequate reduction in acid value by the conventional process of condensation with alcohols such as glycerol or pentaerythritol or their partial esters. However, I have found that the reduction can be effected simply and without undesirable side effects by the use of oxirane compounds, with which the carboxyl groups are esterified by a process of direct addition. Suitable oxirane compounds having the group

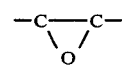

include:
ethylene oxide
propylene oxide
epichlorohydrin
methyl glycidyl ether
phenyl glycidal ether
glycidyl ethyl hexoate
glycidyl versatate (available commercially under the trade name Cardura "E")
epoxidized fatty esters such as the epoxidized soya bean oil derivative (available under the trade name Abrac "C")

When one or more of these compounds is added to an alkyd resin solution in stoichiometric excess over the acid value of the resin and then heated under reflux conditions for a period of time, (not necessarily more than an hour) but variable with the compound and with the excess used, the acid value is reduced; and when the substituted aluminum compound is added to it, the process of thickening, which sometimes occurs as a result of reaction with carboxyl groups, is prevented and the product remains stable.

Surprisingly, and in addition to this improvement in stability with aluminum compounds, the resulting reduction in acid value is associated with an improvement in drying over and above that attributable with the incorporation of the aluminum compound. This is thought to be due to both an improvement in oxidation rate, made possible by a reduction in the acid value, and by an acceleration of the free radical generation which is also made possible by the reduced acidity and causing the polymerization of the alkyd to be more rapid.

The effect of aluminum compounds in comparison with conventional lead and lead/calcium compounds as "through driers" used in conjunction with the "surface drier" cobalt, is exemplified in the following Tables. All parts in the Examples and Tables are by weight. The aluminum driers used were derived from aluminum tri-isopropoxide by introducing some of the substituent groups already described in the place of isopropoxide groups. Similar compositions can equally be derived from other suitable alkoxides of aluminum.

EXAMPLE 1

Aluminum monoisopropoxide mono versatate-(monoisopropyl)phthalate: 466 parts
Isopropanol: 239 parts
Aluminum metal content 4%

EXAMPLE 2

Aluminum diethoxy ethoxide mono versatate: 378 parts
Isopropanol: 180 parts
Ethoxyethanol: 201 parts
Aluminum metal content 4%

EXAMPLE 3

Aluminum triethoxy ethoxide: 294 parts
Isopropanol: 180 parts
Ethoxyethanol: 201 parts
Aluminum metal content 4%

When these compounds were used to replace the lead component of a cobalt/lead mixture used to catalyze the drying of the long oil length proprietory alkyd medium known as Beckolin and were used in the proportions shown, they conferred the improved drying ratios recorded in Table 1.

Additionally, it was found that when the dried films, applied to glass plates, were immersed in water, those in which the aluminum driers were used resisted "whitening" due to water absorption better than did either the cobalt or cobalt/lead drier films. On the other hand, storage stability of the aluminum compounds, when they were exposed to open atmospheric conditions, proved inferior to the conventional cobalt and lead driers with which they were being compared.

Aluminum drier Examples 4, 5, and 6, were formulated to have greater stability in contact with the atmosphere, while in other respects possessing the desirable properties of Examples 1, 2, and 3.

EXAMPLE 4

Aluminum monoisopropoxide monoethoxy ethoxide monoethylacetoacetate: 304 parts
Isopropanol: 120 parts
White spirit: 251 parts
Aluminum metal content 4%

EXAMPLE 5

Aluminum diethoxy ethoxide monoacetyl acetonate: 304 parts
Alkali refined linseed oil: 371 parts
Aluminum metal content 4%

EXAMPLE 6

Aluminum monoethoxy ethoxide diacetyl acetonate: 314 parts
Isopropanol: 180 parts
White spirit: 181 parts
Aluminum metal content 4%

The tautomeric compounds used in these three compounds improved their resistance to hydrolysis to such an extent that the compounds could be left exposed to ambient atmospheric conditions for periods as long as three months without undergoing irreversible physical change and without losing their efficacy as driers when added to alkyd and other oleo resins media.

However, whenever all the aluminum driers were added to alkyd media, there was evidence of storage instability manifested by thickening at certain critical concentration levels, and in particular, at levels of between 0.15% and 1% of aluminum expressed as metal based on the weight of the non-volatile component of the medium to which the aluminum compound was added. This instability was seen to be increasingly pronounced with media of diminishing oil length and increased viscosity. It was also aggravated by increasing concentrations of free carboxylic acid groups, measured or expressed as increased acid value. The rate of thickening increased when the content of such labile stabilizers as isopropanol, particularly ethoxyethanol, was reduced. It was diminished by the association with the aluminum of such sterically protective groups as the versatate radical.

By eliminating, or substantially reducing, the content of the carboxyl groups in the paint medium, I have found it possible to ensure that the media which thickened with the addition of aluminum compounds at the 0.25 to 1.0% aluminum content level would, in a modified form, have satisfactory stability when containing these amounts of added aluminum. The reduction in acid value was achieved in Examples 7, 8 and 9 by heating alkyd resin solutions to between 100° and 160° C. with an amount of epoxide sufficient to convert the carboxylic acid into the corresponding ester. In this way, the acid value of the three alkyd resins exemplified was reduced to less than 1 mgm. KOH per gram.

EXAMPLE 7

Paralac 10W: 748 parts
White spirit: 374 parts
Lankroflex GE: 53.7 parts

The Paralac 10W resin solution diluted further to 50% solids content with white spirit was refluxed with the Lankroflex GE until the acid value had dropped from the initial level of 8.4 to less than 1. Lankroflex GE is a product of Lankro Chemicals and is described as an epoxidized soy bean oil derivative with an epoxide equivalent weight of 268.5.

EXAMPLE 8

Medium/long soya alkyd resin solution of 50% concentration in white spirit: 770 parts
Glycidyl versatate: 34.5 parts The alkyd resin solution was refluxed with the glycidyl versatate until the acid value had dropped from the original 7.3 to less than 1.

EXAMPLE 9

Paralac 11W: 132 parts
Glycidyl versatate: 3.5 parts

This medium length linseed oil modified alkyd resin solution of 52% solids content, supplied by ICI Ltd., under the proprietary name "Paralac 11W" and having an acid value as a 52% solution in white spirit of about 5, was heated under reflux with the versatate until the acid value had dropped to 0.2.

In Table 2, it can be seen that the modification of Paralac 10W, by treatment with the epoxidized fatty ester, Lankroflex GE, has resulted in a change from the unsatisfactory to satisfactory level of stability at the two critical levels of aluminum addition used. Furthermore, the drying characteristics conferred by the aluminum compound compare favorably with those obtained with the normal cobalt/lead combination, as used with both the unmodified and modified alkyd resin.

Table 3 confirms the same pattern of drying performance in a slower drying alkyd medium which is less critical from the stability point of view. Table 4, on the other hand, highlights the benefits obtainable from the use of aluminum driers with higher molecular weight, highly polar alkyd media. In the case, the reduction in acid value effected by reaction with an epoxy compound has resulted in the most dramatic improvement in stability. Likewise, the high polarity has helped the co-ordination drier to function more effectively and accounts for the higher level of drying efficiency obtained for the cobalt/aluminum systems when compared with the corresponding cobalt/calcium lead systems.

TABLE I

| | | | | | | | | |
|---|---|---|---|---|---|---|---|---|
| Beckolin | 100 | 100 | 100 | 100 | 100 | 100 | 100 | 100 |
| White Spirit | 67 | 67 | 67 | 67 | 67 | 67 | 67 | 67 |
| 6% Co. Naphthenate | 0.83 | 0.83 | 0.83 | 0.83 | 0.83 | 0.83 | 0.83 | 0.83 |
| 24% Pb. Naphthenate | — | 2.08 | — | — | — | — | — | — |
| Example 1 | | | 16 | 32 | — | | | |
| Example 2 | | | | | 32 | | | |
| Example 3 | | | | | | 2 | 8 | 32 |
| Drying Stage 1 (hrs) | 4.5 | 1.75 | — | — | — | 2.25 | 2.0 | — |
| Drying Stage 2 (hrs.) | 5.5 | 2.75 | 3.6 | 2.0 | 1.5 | 3.0 | 3.3 | 1.5 |
| Drying Stage 3 (hrs.) | 10 | 4.5 | 6.0 | 7.0 | 5.0 | 3.25 | 5.25 | 3.3 |
| Drying Stage 4 (hrs.) | 13.5 | 9.25 | 8.25 | 10.5 | 8.25 | 6.5 | 7.0 | 7.0 |
| Sand dry time (hrs.) | 5.5 | 2.5 | 3.75 | 2.5 | 2.5 | 4.0 | 3.5 | 2.5 |

TABLE 2

| | | | | | | |
|---|---|---|---|---|---|---|
| Paralac 10W/50 | 200 | — | 200 | 200 | — | — |
| Modified Paralac 10/W/50 (Example 7) | — | 200 | — | — | 200 | 200 |
| 6% Cobalt Naphthenate | 1 | 1 | 1 | 1 | 1 | 1 |
| 24% Lead Naphthenate | 2.5 | 2.5 | | | | |
| Aluminum drier No. 4 | | | 12.5 | 25 | 12.5 | 25 |
| Stability | Stable | Stable | Gelled 6 days | Gelled 10 days | Stable | Stable |
| Drying Stage | | | | | | |
| 1 (hrs.) | 0.3 | 0.3 | 0.2 | 0.1 | 0.3 | 0.1 |
| 2 (hrs.) | 0.8 | 0.6 | 0.6 | 0.3 | 0.7 | 0.3 |
| 3 (hrs.) | 1.7 | 1.6 | 1.6 | 1.0 | 1.7 | 1.0 |
| 4 (hrs.) | 4.9 | 2.6 | 2.6 | 1.8 | 2.9 | 1.75 |

TABLE 3

| | | | | | | | |
|---|---|---|---|---|---|---|---|
| Medium/Long Soya Alkyd Solution | 200 | 200 | — | — | — | — | — |
| Modified Soya Alkyd Solution (Example 8) | — | — | 200 | 200 | 200 | 200 | 200 |
| 6% Cobalt Naphthenate | 1 | 1 | 1 | 1 | 1 | 1 | 1 |
| 5% Calcium Naphthenate | 6 | 3 | 6 | 3 | — | — | — |
| 24% Pb Naphthenate | 2.5 | — | 2.5 | — | — | — | — |
| 18% Zirconium Octoate | — | 0.5 | — | 0.5 | — | — | — |
| 4% Al drier Example 6 | | | | | 12.5 | 25 | 50 |
| Stability | Stable | Stable | Stable | Stable | Stable | Stable | Stable |
| Drying Stage 1 (hrs.) | 0.2 | 0.25 | 0.3 | 0.4 | 0.4 | 0.5 | 0.6 |
| 2 (hrs.) | 6.7 | 9 | 2.9 | 8.1 | 4.8 | 4.1 | 3.6 |
| 3 (hrs.) | 7.9 | 10.2 | 4.8 | 10.5 | 6.7 | 5.9 | 5.5 |
| 4 (hrs.) | 8.6 | 10.3 | 8.5 | 12.5 | 7.5 | 6.8 | 6.5 |

TABLE 4

| | | | | | | |
|---|---|---|---|---|---|---|
| Paralac 11W | 200 | — | 200 | — | — | — |
| Modified Paralac 11W (Example 9) | — | 200 | — | 200 | 200 | 200 |
| 6% Cobalt Naphthenate | 1 | 1 | 1 | 1 | 1 | 1 |
| 24% Lead Naphthenate | 2.5 | 2.5 | — | — | — | — |
| 5% Calcium Naphthenate | 6 | 6 | — | — | — | — |
| 4% Aluminum Drier (Example 5) | — | — | 12.5 | 12.5 | 25 | 50 |
| Stability | Stable | Stable | Gelled 2 days | Stable | Stable | Stable |
| Drying Stage | | | | | | |
| 1 (hrs.) | 0.2 | 0.4 | 0.4 | 0.4 | 0.5 | 0.7 |
| 2 (hrs.) | 0.7 | 0.9 | 1.25 | 1.1 | 1.4 | 1.6 |
| 3 (hrs.) | 6.8 | 7.2 | 5.0 | 5.1 | 5.4 | 5.2 |
| 4 (hrs.) | 16.6 | 12.3 | 6.6 | 7.1 | 6.8 | 6.0 |

When water is the labile monofunctional reactant, the compositions may be prepared by the addition of water or a mixture of water and another labile monofunctional reactant to the aluminum compound (RO)-AlAB which itself may be dissolved in a diluent, the said diluent either being an inert material such as white spirit or one or more of the aforesaid labile monofunctional reactants. Other inert diluents, both volatile and non-volatile, which may be used are for example xylene, hydrocarbons and chlorinated hydrocarbons. Alternatively the water may be added to the compound (RO)-AlAB together with another labile monofunctional reactant, both being contained in an inert solvent.

In addition to improved storage properties of paint compositions containing the driers of the invention, the presence of water may increase the flash point over other similar compositions and the cost of mateials for their production is reduced.

In a modification of the invention, it is possible to use an amount of the labile monofunctional reactant and water or water alone less than that dictated by the quantity of reactive groups on the aluminum compound. Because the reaction of the aluminum compound and the drying oil produces a labile monofunctional reactant product which will act as an inhibitor of further reaction. It is important when using the modification, however, that the degree of reaction between the aluminum compound and the drying oil is not too great.

The following are further examples of the invention.

EXAMPLE 10

Aluminum isopropoxide: 204 parts
Ethyl acetoacetate: 130 parts
Water: 54 parts
White spirit: 287 parts
Aluminum content (as metal) 4%
Molar Ratio $H_2O$:Al: 3:1

EXAMPLE 11

Aluminum triethoxyethoxide: 294 parts
Ethoxyethanol: 363 parts
Water: 18 parts
Aluminum content (as metal) 4%
Molar Ratio $H_2O$:al: 1:1

EXAMPLE 12

Aluminum diethoxyethoxide mono ethylacetoacetate: 334 parts
Water: 36 parts
White spirit: 305 parts
Aluminum content (as metal) 4%:
Molar Ratio $H_2O$:Al: 2:1

EXAMPLE 13

Aluminum triethoxyethoxide: 294 parts
Ethyl acetoacetate: 130 parts
Water: 54 parts
Bereclor 545: 225 parts
Ethoxyethanol: 182 parts
Aluminum content (as metal) 3%
Molar Ratio $H_2O$:Al: 3:1

EXAMPLE 14

For comparison the 2 moles of water in Example 12 were replaced by 2 moles of ethoxyethanol to give a composition as follows:

Monoethyl acetoacetate: 334 parts
Ethoxy ethanol: 180 parts
White spirit: 161 parts
Aluminum content (as metal) 4%
Molar Ratio $H_2O$:Al: 0

EXAMPLE 15

Aluminum isopropoxide: 204 parts
Ethyl acetoacetate: 130 parts
30% aqueous hydrogen peroxide: 55 parts
White spirit: 286 parts
Aluminum content (as metal) 4%
Molar Ratio $H_2O$:$H_2O_2$:Al: 2:1:1 (approx.)

EXAMPLE 16

Aluminum diethoxyethoxide monoethyl acetoacetate: 344 parts
t-butyl hydroperoxide (70% soln. in di-t-butyl peroxide): 128 parts
White spirit: 213 parts
Aluminum content (as metal) 4%
Hydroperoxide:Al (Molar): 1:3

The compositions were added to a paint medium consisting of a 50% solution of Paralac 40 WLV in white spirit. Paralac 40 WLV is a semi-drying type of alkyd resin based on pentaerythritol and phthalic anhydride present to an excess of 65% of the solid resin composition. The level of the aluminum composition to the medium is 1% of elemental aluminum based on the weight of the non-volatile component of the medium.

The drying performance of the compositions exemplified are comparable with the drying compositions of Example 1–9 and have better storage characteristics.

The paint compositions containing the drier compositions of Examples 10–13 remained of low viscosity after storing for 6 months, while the composition containing the drier of Example 14 increased in viscosity over a period of 3 weeks and developed a slack gel.

TABLE 5

| Unpigmented 62% Soya/pentaerythritol/alkyd 50% solids applied at film thickness 0.003 inch (wet) and dried at 20° C. 65% relative humidity | | | |
|---|---|---|---|
| Alkyd | 100 | 100 | 100 |
| Cobalt | 0.06 | 0.06 | 0.06 |
| Zirconium | 0.09 | — | — |
| Calcium | 0.15 | — | — |
| Aluminum (Example 14) | — | 1.5 | — |
| (Example 12) | — | — | 1.5 |
| Drying Stage 1 (hrs.)* | 0.6 | 0.6 | 0.5 |
| Stage 2 (hrs.) | 1.2 | 1.3 | 1.4 |
| Stage 3 (hrs.) | 2.7 | 2.6 | 2.3 |
| Stage 4 (hrs.) | 12.0 | 5.8 | 4.6 |

*Becke Koln Machine

TABLE 6

| | 72% Linseed/Glycerol alkyd. Pigmented $TiO_2$ and tested for drying at low and ambient temperatures | | | | | | | | |
|---|---|---|---|---|---|---|---|---|---|
| Conditions | 7° C. 50% RH | | | 7° C. 75% RH | | | 20° C. 80% RH | | |
| Alkyd | 100 | 100 | 100 | 100 | 100 | 100 | 100 | 100 | 100 |
| Cobalt | 0.06 | 0.06 | 0.06 | 0.06 | 0.06 | 0.06 | 0.06 | 0.06 | 0.06 |
| Zirconium | 0.09 | — | — | 0.09 | — | — | 0.09 | — | — |
| Calcium | 0.15 | — | — | 0.15 | — | — | 0.15 | 0.30 | — |

TABLE 6-continued

72% Linseed/Glycerol alkyd. Pigmented TiO$_2$ and tested for drying at low and ambient temperatures

| Conditions | 7° C. 50% RH | | | | 7° C. 75% RH | | | | 20° C. 80% RH | | |
|---|---|---|---|---|---|---|---|---|---|---|---|
| Lead | — | — | — | — | — | — | — | 0.60 | — | — | |
| Aluminum (Example 14) | — | 1.5 | — | — | 1.5 | — | — | — | 1.5 | — | |
| (Example 12) | — | — | 1.5 | — | — | 1.5 | — | — | — | 1.5 | |
| Drying Stage 1 (hrs.) | 6.2 | 3.5 | 5.1 | 5.5 | 3.6 | 5.1 | 2.0 | 0.8 | 2.0 | 2.0 | |
| Stage 2 (hrs.) | 7.5 | 4.7 | 7.7 | 7.7 | 5.3 | 6.9 | 3.0 | 1.7 | 2.7 | 2.9 | |
| Stage 3 (hrs.) | 9.1 | 7.9 | 9.6 | 12.0 | 13.0 | 9.0 | 5.0 | 3.5 | 3.5 | 4.0 | |
| Stage 4 (hrs.) | 22.0 | 13.5 | 10.9 | 13.8 | 15.4 | 13.1 | 7.25 | 18.0 | 5.4 | 4.8 | |
| Appearance | Surface skin | Good through dry | Best through dry | Surface skin | Good through dry | Best through dry | Sl. tacky surface skin | Tacky wrinkled | Good Surface and through dry | Best surface through dry | |

TABLE 7

68% Linseed/Pentaerythriol/Phthalic Anhydride Alkyd. Unpigmented and used as a 40% solution in white spirit. Tested for drying at 25° C. and 100° C. and for storage stability at 25° C.

| Alkyd | 100 | 100 | 100 | 100 | 100 | 100 | 100 |
|---|---|---|---|---|---|---|---|
| Cobalt | 0.06 | 0.06 | — | — | 0.06 | — | — |
| Manganese | — | — | 0.06 | 0.06 | — | — | — |
| Aluminum (Example 10) | 2.0 | — | 2.0 | — | 2.0 | 2.0 | — |
| (Example 15) | — | 2.0 | — | 2.0 | — | — | 2.0 |
| Oven Temp. (°C.) | 25 | 25 | 25 | 25 | 100 | 100 | 100 |
| Sand dry (hrs.) | 0.3 | 0.3 | 0.4 | 0.3 | | | |
| Hard dry (hrs.) | 3.4 | 2.1 | 3.6 | 2.6 | 1.2 | 3.5 | 1.0 |
| Stability | Good | Poor | Good | Fair | | | |
| Film quality | | Good | | | Good | Good | Best Color |

TABLE 8

78% Linseed/Pentaerythritol/Phthalic Anhydride Alkyd. Unpigmented and used as 65% solution in white spirit for drying tests at 22° C. and 100° C.

| Alkyd | 100 | 100 | 100 | 100 | 100 | 100 | 100 | 100 |
|---|---|---|---|---|---|---|---|---|
| Cobalt | 0.06 | 0.06 | — | — | 0.06 | 0.06 | — | — |
| Manganese | — | — | 0.06 | 0.06 | — | — | — | — |
| Aluminum (Example 12) | 2.0 | — | 2.0 | — | — | 2.0 | 2.0 | — |
| (Example 16) | — | 2.0 | — | 2.0 | — | — | — | 2.0 |
| Drying Temp. (°C.) | 22 | 22 | 22 | 22 | 100 | 100 | 100 | 100 |
| Sand dry (hrs.) | 2.2 | 1.3 | 3.5 | 3.2 | — | — | — | — |
| Hard dry (hrs.) | 5.4 | 3.5 | 14.5 | 11.0 | 3.6 | 2.0 | 6.5 | 1.5 |
| Storage stability | Good | Poor | Good | Good | Good | Good | Good | Good |
| Film quality | | Excellent | Fair | Good | Wrinkled badly | Wrinkled at edges | Fair discolored | Good |

EXAMPLE 17

Aluminum triethoxyethoxide: 294 parts
Ethyl acetoacetate: 130 parts
Hydrogen peroxide (30%) added in 36 parts of ethoxyethanol: 36 parts This product when used at a concentration of 1% aluminum metal with a 60% solution of a soya bean oil modified alkyd resin using pentarythritol as the esterifying alcohol and having a viscosity of 2.5 poises at 25° C. gives a film forming composition which dries rapidly and does not suffer from oxidative degradation for a period of at least nine months.

Various changes and modifications of the invention can be made, and to the extent that such variations incorporate the spirit of this invention, they are intended to be included within the scope of the appended claims.

What is claimed is:

1. In a method for forming a storage-stable composition by addition of an alkoxyaluminum compound to a drying oil resin or ester containing hydroxyl or carboxyl groups, the improvement which comprises adding to and reacting under ambient conditions with said alkoxyaluminum compound at least one gram mole of a labile monofunctional reactant per gram atom of aluminum in said alkoxyaluminum compound prior to addition of said alkoxyaluminum compound to said drying oil resin or ester, thereby forming a fluid, storage-stable mixture which is resistant to gelation until said labile monofunctional reactant is released from said mixture by evaporation or hydrolysis, wherein said labile monofunctional reactant is selected from the group consisting of lower alkanols having up to about eight carbon atoms, tert-butyl hydroperoxide, cumenyl hydroperoxide, water, hydrogen peroxide, and mixtures thereof and wherein said alkoxyaluminum compound has the formula

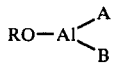

in which R is selected from the group consisting of lower alkyl, lower cycloalkyl, and lower alkoxyalkyl, and each of said A and B is selected from the group consisting of OR and 2-ethylhexoate, 3,5,5-trimethylhexoate, versatate, naphthenate, acid monoisopropyl phthalate, acid monoethoxyethoxyl maleate, ethyl acetoacetate, and acetylacetone.

2. The method according to claim 1 in which said labile monofunctional reactant is ethoxyethanol.

3. The method according to claim 1 in which said labile monofunctional reactant is isopropanol.

4. The method according to claim 1 in which said labile monofunctional reactant is a mixture of hydrogen peroxide and ethoxyethanol.

5. The method according to claim 1 in which said alkoxyaluminum compound is aluminum monoisopropoxide monoversatate(monoisopropyl)phthalate.

6. The method according to claim 1 in which said alkoxyaluminum compound is aluminum diethoxyethoxide monoversatate.

7. The method according to claim 1 in which said alkoxyaluminum compound is aluminum triethoxyethoxide.

8. The method according to claim 1 in which said alkoxyaluminum compound is aluminum monoisopropoxide monoethyoxyethoxide monoethylacetoacetate.

9. The method according to claim 1 in which said alkoxyaluminum compound is aluminum diethoxyethoxide monoacetylacetonate.

10. The method according to claim 1 in which said alkoxyaluminum compound is aluminum monoethoxyethoxide diacetylacetonate.

11. The method according to claim 1 in which said drying oil resin or ester is an alkyd resin.

* * * * *